May 16, 1939. J. R. LANKENAU Re. 21,092

GARMENT AND FASTENING MEANS

Original Filed May 20, 1937 3 Sheets-Sheet 1

Inventor:
John R. Lankenau,
by Emery, Booth, Townsend, Miller & Weidner
Attys

May 16, 1939. J. R. LANKENAU Re. 21,092

GARMENT AND FASTENING MEANS

Original Filed May 20, 1937 3 Sheets-Sheet 2

Inventor:
John R. Lankenau,
by Emery, Booth, Townsend, Miller & Wetherill
Attys

May 16, 1939. J. R. LANKENAU Re. 21,092

GARMENT AND FASTENING MEANS

Original Filed May 20, 1937 3 Sheets-Sheet 3

Inventor:
John R. Lankenau,
by Emery, Booth, Townsend, Miller & Warden
Attys

Reissued May 16, 1939

Re. 21,092

UNITED STATES PATENT OFFICE 21,092

GARMENT AND FASTENING MEANS

John R. Lankenau, Brighton, Mass.

Original No. 2,134,976, dated November 1, 1938, Serial No. 143,767, May 20, 1937. Application for reissue filed December 1, 1938, Serial No. 243,409

8 Claims. (Cl. 128—284)

My present invention relates to garments. In general, it is concerned primarily with infant's wear, and more particularly aims to provide a lower garment for infants which shall serve the purposes of the usual napkin or diaper and also, by reason of its extensive adjustability and other novel features may have a wider use, in the nature of a pant or so called training pantie, for infants beyond the usual diaper-wearing ages. In its broader aspects, and especially as regards certain novel fastening arrangements, the invention is applicable to various other garments, including underwear, night wear and other apparel for persons other than infants.

In the drawings, illustrating by way of example certain embodiments of the invention—

Fig. 7 is a perspective view on a reduced scale of a removable insert or absorbent pad for use in conjunction with the garment of the invention;

Figure 1:
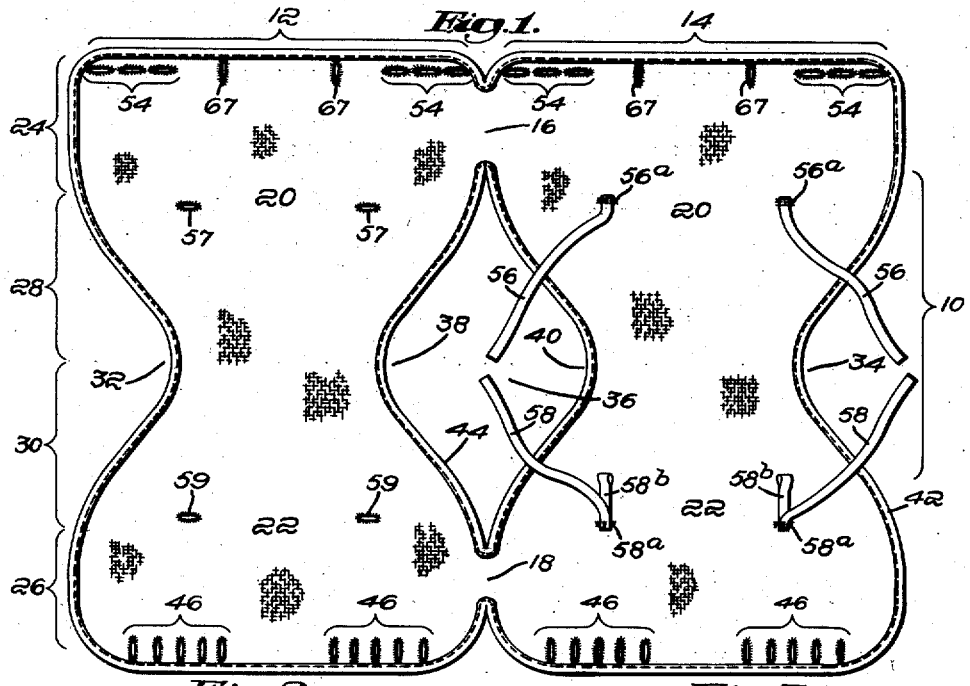
Fig. 1 is a plan of one form of diaper garment, showing the same in its fully extended condition.

Referring more particularly to the drawings, the garment selected for the purposes of illustration, indicated as a whole by the numeral 10, comprises one, two or more thicknesses of suitable fabric material, such for example as commonly known as diaper cloth or bird's-eye of initial general rectangular form. The fabric body as a whole, generally composed of a superposed plurality of such fabric layers, is cut and finished to define two similar main parts 12 and 14 each having the same shape and dimensions, being in this instance of a form resembling that of an hourglass. These two main parts 12 and 14, which become inner and outer elements in the wearing position of the garment, are integrally connected at their adjacent widest portions, as at 16 and 18, Figs. 1, 2 and 3.

Each of these main parts 12 and 14 comprises a rear section 20 and a connected front section 22, each of which sections includes a waist or band portion 24 and 26 respectively and an intermediate connecting or leg portion 28, 30 respectively. At the opposite sides of the garment fabric, in its fully unfolded condition as in Fig. 1, and at substantially mid-height are cut-in or re-entrant formations 32, 34, and the fabric is cut out centrally as at 36 to form two oppositely disposed re-entrant formations 38, 40, similar to those at the outer sides, whereby the two main parts 12 and 14 have the same contour and are symmetrically disposed, so that they may be folded over one onto the other into matching relation, as illustrated in Fig. 2. All edge portions of the garment may be finished in any preferred manner, thereby uniting any plurality of layers of fabric, as by pinking and stitching about the edges, or providing the edges with an over-edge stitching or by binding them with a suitable soft non-irritating binding as herein illustrated at 42 and 44.

An important object of the invention is to avoid entirely the use of pins for attaching it and also to leave the garment free of permanently mounted attaching or fastening means such as buttons, and at the same time to afford a wide range of adjustability for the garment. Accordingly I provide along the waist or band portion of one of the sections, herein the front sections 26, and at each side of their vertical median lines, a series of slits or eyelets 46, 46, five of which are illustrated in each series in the present instance. These eyelets provide means for mounting on the garment detachable fastening means or fastener elements, one of which, designated as a whole by the numeral 48, is seen separately in Fig. 6.

Each such element comprises an elongated fabric strip 49, preferably of a woven fabric material which is soft but of adequate strength for securing purposes. At one end portion of the strip 49 is secured a button 50, and spaced lengthwise of the strip from the button 50 are one or more buttonholes 51, 51 for selective engagement with the button when the strip is looped or doubled in the manner to be described. These fastener elements are demountably attached to the garment, one for each of two series of eyelets 46, 46 presented when the garment is in its double or folded form of Fig. 2, by inserting one end of the strip, preferably the buttonhole end, through one superposed pair of eyelets, doubling the strip back on itself and bringing it out through another pair of eyelets. These latter may be the next adjacent eyelets, to either side of the first, or any other selected pair of the series. The free ends of the fastener are thus brought to the same face of the garment and the button is passed through one or the other of the button holes 51 as may be convenient in the particular case. Accordingly there is present at the inner face of the waist of the front section merely a flat portion of the strip 49, as clearly seen at the lower portion of Fig. 2, while at the outer face of said front section, as best seen in Fig. 3, the ends of the fastener element are overlapped and secured together by passing the button 50 through the selected buttonhole 51, leaving the button available for garment securing purposes. It will also be noted that where the garment is of the separable double construction such as shown, in which the two main parts 12 and 14 are not permanently stitched together flatwise but may be opened out as in Fig. 1, the described fastener strips serve not only to anchor the buttons but also to hold the two main sections together flatwise during use.

For cooperation with these detachable fastener elements I provide at corresponding positions upon the waist or band portion 24 of the other section, herein the rear section 20 one or preferably a plurality of buttonholes 54, 54 any one of which selectively is adapted to receive the button 50 at the corresponding side of the front section 22. These buttonholes are preferably disposed with their longitudinal axis crosswise the garment, in the general direction of the major strains on them, substantially as illustrated.

Figure 3:
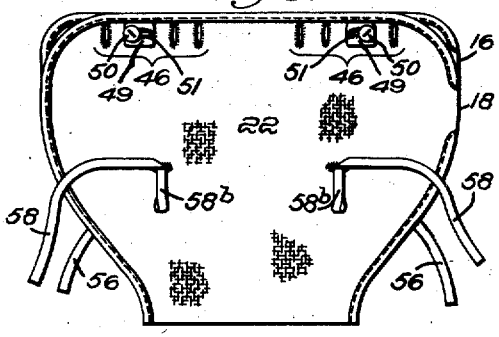
Fig. 3 shows the garment of Figs. 1 and 2 folded transversely to bring the front and rear sections adjacent each other.
Figure 4:
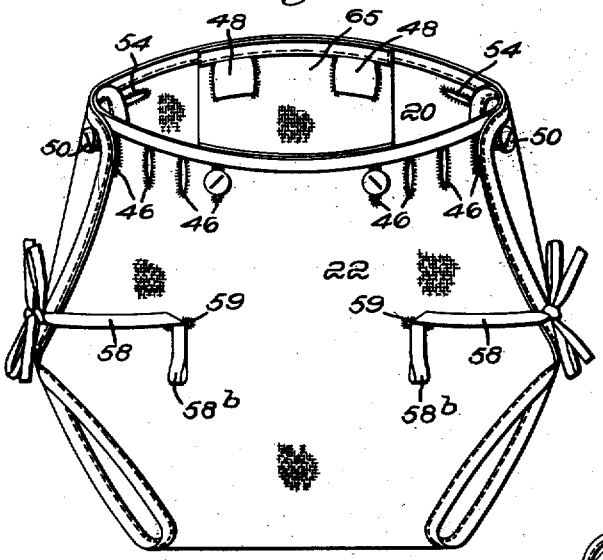
Fig. 4 illustrates the same garment substantially as in wearing position and adjusted to a large size.
Figure 5:
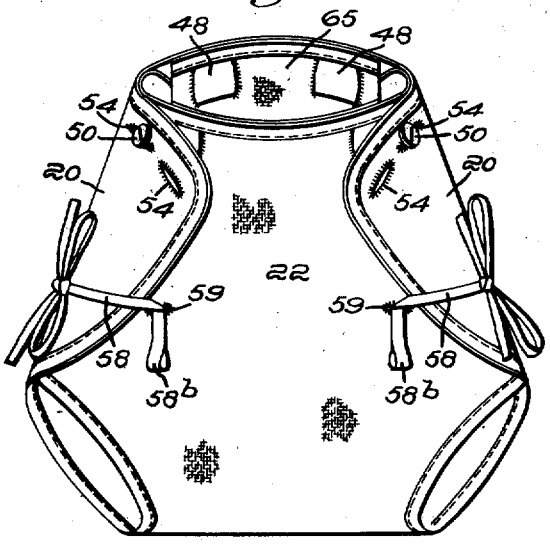
Fig. 5 is a view similar to Fig. 4 showing a smaller size adjustment of the garment.
Figure 6:
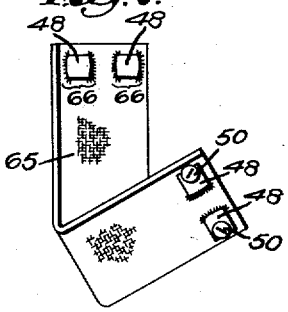

As will be apparent from a comparison of Figs. 3, 4, 5, the construction as illustrated and described enables the garment to be secured in wearing position in a large number of positions of circumferential adjustment. For example, in the particular instance selected for illustration, the fastener elements 48 of the front section may be anchored in the outermost pair of eyelets 46, as in Fig. 4, or in an intermediate pair of eyelets, or in the innermost pair of eyelets. At another time they may be received in non-adjacent eyelets, for example the outermost and innermost eyelet, in which case the fastener causes the fabric of the garment to be tucked or reefed to an extent depending on which of the buttonholes 51 is selected for reception of the button 50. If a symmetrical arrangement is not considered important, still further variation as to the location of the fastener elements may be obtained by placing them differently at the two sides of the garment.

In addition to the wide latitude of adjustment afforded by the adjustable location of the fastener elements on the front section, still further adjustment is afforded in the selection of a particular one of the buttonholes 54 of the rear section, where a plurality thereof is provided at each side of said section, as shown in the drawings. Thus in the illustrated example, wherein a series of three buttonholes 54 is supplied, there are three different buttoning positions, with respect to the rear section, for each location of the corresponding fastener element 48. In other words, if there are four available adjusted positions for the fastener element, then, in the case of a series of three buttonholes on the rear section, there is a total of twelve positions of adjustment for each side of the garment, which total may be still further increased by locating the fastener elements differently at the two sides.

For example, in Fig. 4, illustrating one of the larger adjusted positions, the fastener elements 48 are disposed in the outermost pair of eyelets 46 of the front section and the button 50 is received in the outermost buttonhole 54 of the rear section, with a relatively small lateral overlap of the two sections. By contrast, in Fig. 5, illustrating one of the smaller positions of adjustment, each fastener element 48 is disposed in an inner pair of eyelets 46 and its button 50 is received in an inner buttonhole 54, with a relatively large overlapping of the side portions of the front and rear sections.

While the novel fastening means as illustrated and described is particularly useful in combination in a garment of the infants' or diaper type, it will be understood that said fastening means, including a flexible attaching strip carrying a button and one or more buttonholes therefor, for use in association with two or more eyelets in one portion of a garment and one or more buttonholes in another portion which is to be secured to the first one, is susceptible of use in connection with garments in general and of various types such for example as pyjamas, shorts, drawers, bathing and other sports wear, and other articles of apparel.

In cooperation with the described means for securing the waist portion of the garment in the numerous positions of adjustment, means is also provided for securing together the leg portions of the garment at the corresponding sides, also with wide latitude for adjustment. For this purpose I have herein illustrated, in the form of garment as in Figs. 1 to 5, securing ties 56, 56 of tape or other textile material, for the two sides of the rear section 20 of one of the main parts 12, 14 of Fig. 1, herein the part 14. Similar ties 58, 58 are provided for the leg portion 30 of the front section 22, so that at each side of the garment there is a pair of ties 56 and 58, one on the rear section and one on the front section, adapted to be tied together to adjust and confine the leg portions of the garment in wearing position.

Figure 2:
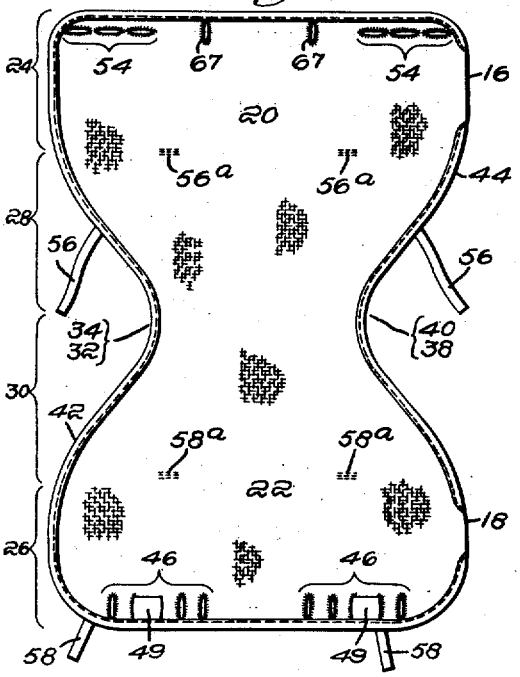
Fig. 2 is a plan of the garment of Fig. 1, one of the two main fabric portions being folded over flatwise onto the other.

In the integral double form of construction for the garment as a whole, as illustrated in Fig. 1, the securing ties need be supplied upon but one of the main parts 12, 14, and they are additionally utilized to assist in holding these two main or inner and outer parts 12 and 14 in matched position one on the other as in Fig. 2. For this purpose the part 12 or 14 which does not carry ties is formed with eyelets 57, 57 and 59, 59 at its rear and front sections respectively, these eyelets being located to come opposite the point of attachment of the ties or tapes 56 and 58 respectively when the other main part, herein the part 14, is folded over onto the one having the eyelets. As viewed in Fig. 1, it is assumed that the right hand or inner part 14 is to be folded over toward the left in said figure, onto the left hand part 12. The ties 56 are passed out through the eyelets 57 of the rear section of the part 12, and the ties 58 are similarly inserted through the eyelets 59 of the front section 22, it being noted that the ties are attached, as by the stitchings 56[a], 56[a] and 58[a], 58[a] at what becomes the inner face of the inner part 14 in the doubled over condition of the garment as in Fig. 2.

As an additional feature of the invention, the ties for at least the front section, herein the ties 58 have their secured ends first doubled upon themselves to form loops 58b, 58b and the stitchings 58a are applied so as both to attach the ties as a whole and also to retain the loops 58b. These latter are adapted to be passed outwardly through the eyelets 59 together with the tying portions of the ties, so as to be available at the front of the garment, as seen in Figs. 3, 4 and 5, for the attachment of stockings or other articles. The attachment points for each of the ties are disposed substantially inwardly from the lateral edges of the leg portions of the garment, thus allowing for considerable variation in the extent of overlapping of the front and rear sections, to conform to the individual requirements of the wearer, and the ties are of sufficient length to adapt themselves to such wide variation in overlap of the leg portions and so as to cooperate with the fastening means of the waist or band portions to afford a snug but comfortable fit and adjustment of the garment as a whole, irrespective of the particular size required at the waist. Requirements in this connection may vary widely, some infants having large abdomens and relatively small legs while with others the reverse condition may be found.

Figure 8:
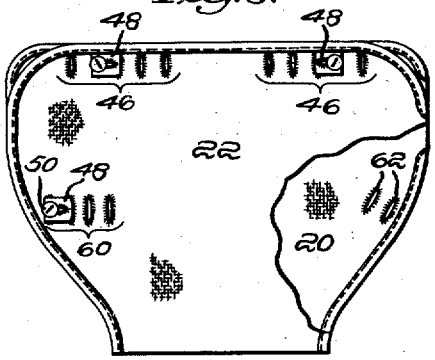
Fig. 8 is a view similar to Fig. 3 illustrating a modified form of securing means for the leg portions.

In Fig. 8 I have illustrated a modified form of adjustable securing means for the leg portions, the garment in other respects being similar to that of the previous figures. In this instance I utilize for this purpose fastener elements 48 of the character already described. One section of the garment, herein the front section 22 accordingly is provided with a series of transversely spaced slits or eyelets 60, as seen at the left in Fig. 8, and the other or rear section 20 has one or more buttonholes 62 for selective reception of the button 50 of the corresponding fastener element 48. Hence in this instance the fastening means for the leg portions of the garment are bodily detachable similarly as those for the waist portion.

The garment and fastener means of the invention are readily adapted for use in conjunction with replaceable or disposable absorbent inserts or pads, one of which I have illustrated separately in Fig. 7, the same also being shown in attached position in Figs. 4 and 5. Such pad, indicated as a whole by the numeral 65, may be composed of any suitable absorbent material, preferably of an inexpensive type which may economically be thrown away after use, such as one or more layers or webs of paper or other fibrous or cellulosic material. The pad is of a length to extend from the top of the front section of the garment through the crotch and leg portions up to the top or waist portion of the rear section. At its opposite ends the pad is formed with one or more, herein two, pairs of slits or eyelets 66, each pair adapted to receive a fastener element 48 of the character already described. In the intermediate and the smaller adjusted positions of the garment the front end of the absorbent pad may be held in place by the same fasteners 48 which are used to secure the waist portions of the garment, the strips 49 being passed through the appropriate slits 66 of the pad in addition to being passed through the selected eyelets 46 in the garment. Such an instance is illustrated in Fig. 5, while in Fig. 4, showing a larger adjusted position, additional fasteners 48 are used for attaching the pad, being secured to the latter as in Fig. 7 and then buttoned in one of the eyelets 46 of the garment. Similarly for the rear end of the pad, in the smaller sizes, the buttons of the fasteners may be passed through the pad, while in other cases additional fasteners will be employed, as in Figs. 4 and 7, additional button holes 67, 67 being supplied at the rear central waist portions of the garment for receiving of the buttons of such fasteners; see Fig. 1. It will be noted that in accordance with the invention the pad is left free of projections at its inner face, such as might be a source of irritation to the wearer, since only flat portions of the fastener strips 49 are exposed at that face.

The integral double symmetrical construction and conformation of the garment as a whole, referring particularly to the main fabric sections 12 and 14, allows for the opening of the garment, from its folded position of Fig. 2, and the insertion of additional layers of fabric or other material, between said two main or inner and outer sections. For example, a layer of moisture-proof or moisture-resistant material such as so-called stork sheeting, a thin layer of rubber, or the like, may be laid in, so that the garment as a whole may be modified or built up to suit various circumstances. By reason of the double construction as illustrated, with permanent attachment only at the areas 16, 18, the garment may quickly be opened to the spread position in Fig. 1, for laundering purposes, and in such open condition will dry much more readily. It will be understood, however, that in other instances a complete garment may be singly formed, so as to correspond in its entirety to but one of the main sections 12 or 14 of Fig. 1, in which case the moisture-proof or moisture-resistant element above mentioned would be at the outside face or the inside face, but generally the former, appropriate apertures being provided in said element for the passage of the tapes, similarly as in the double form of Fig. 1. In other words, a complete garment may have substantially the shape and form as in Fig. 2, such single type of garment being itself composed of any desired number of thicknesses of fabric material. Moreover, by reason of the construction illustrated and the novel type of securing means employed, two or more structurally separate single sections corresponding to the sections 12 and 14 of Fig. 1 may be used in superposed relation, being secured together for use by passing the fastener strips 49 through selected matching eyelets 46.

From the foregoing it will be apparent that the invention provides an inexpensive garment having not only the features of safety, by avoidance of pins, and of wide adjustability to size and proportion, but also a garment which may be termed universal as regards use, since it is evident that the garment will serve the purposes of the ordinary napkin or diaper, may be used as a band or supporting cover for a replaceable absorbent pad, may also, with the insertion of a moisture-resistant layer, take the place of the rubber pants commonly used outside a diaper, and also is adapted to serve in the manner of a preformed garment of the drawers or training-pantie type, for older infants.

Figure 9:
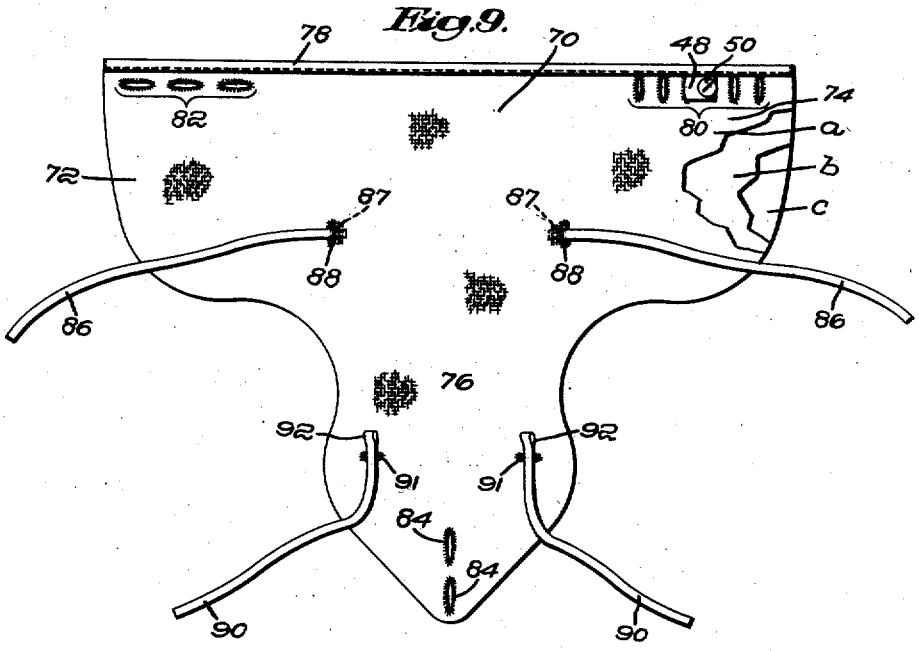
Fig. 9 is a plan of the outer face of another form of diaper garment.
Figure 10:
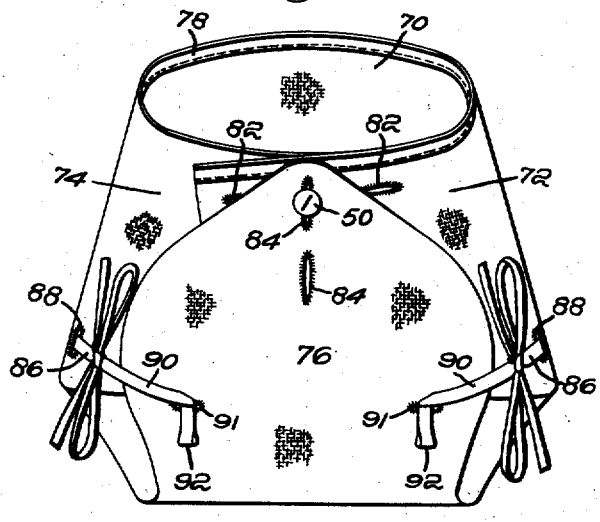
Fig. 10 shows the garment of Fig. 9 in one adjusted position for wear.

Referring now to Figs. 9 and 10, I have there illustrated another form of garment embodying features of the invention including the novel fastening means thereof. In this instance the garment, in its flat condition as in Fig. 9, is of a modified triangular form, including a band-like upper leg and abdominal section 70 hereinafter referred to as the waist section having similar oppositely disposed side portions 72, 74 and a centrally disposed crotch and front section 76, hereinafter referred to as the front section. Fig. 9 shows the outside face of the extended garment. It will be understood that in putting on the garment it is laid out with the other face up, the two sides 72, 74 of the waist section brought forwardly into overlapping relation about the infant's abdomen, and the front section brought up between the infant's legs, into the wearing position as illustrated in Fig. 10.

The garment as a whole preferably comprises a plurality of layers of suitable fabric, such as in the previous figures, three thicknesses being represented in Fig. 9, designated *a*, *b* and *c*, two of which may be integral and formed from the same piece of cloth. In the form shown, the several layers are permanently united only along the upper edge portion of the waist section 70, by stitching or binding or the like as indicated at 78. At their remaining peripheral and other portions the plurality of fabric layers are left entirely free of each other, so that they may be opened out away from each other, for laundering, drying and airing purposes, similarly as explained in connection with Fig. 1. This construction also permits of the insertion of an additional moisture-resistant or other layer between any two adjacent layers, also in a similar manner as with the main parts 12 and 14 of the previous form.

Figure 6:
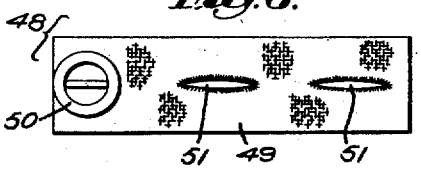
Fig. 6 shows separately and upon a larger scale one form of fastener element comprised in the invention.

Similar fastening means is provided as in the embodiments of Figs. 1 to 8 for securing the waist section, and in this instance also the front section, in wearing position. Accordingly the waist section 70 has at the upper edge of one side portion, herein the side 74, a series of vertically disposed, laterally spaced eyelets 80, six of which are illustrated in Fig. 9. A fastener element 48, such as shown separately in Fig. 6, is adapted to be received in any two adjacent or other eyelets 80, in position for cooperation of its button 50 with a buttonhole 82 at the upper outer part of the other side portion 72. A plurality or series of such buttonholes 82 desirably is supplied, three being shown in the drawings, these buttonholes preferably being horizontally disposed, to resist strains circumferentially of the garment.

For further cooperation with the fastener 48 and its button 50, the front section 76 has formed centrally thereof at its end portion one, and preferably a plurality, of vertically spaced buttonholes 84, two of which are here shown, either of them selectively adapted to receive the button of the fastening means, in the adjusted wearing position of the garment. Thus in this instance provision is made not only for wide variation in waist size adjustment but also for adjustment vertically, as to depth of seat room. Where the series of eyelets includes six such members it will be evident that the fastener element has five available attaching positions, not counting possible attachment in other than two adjacent eyelets. Multiplying this number by the number of buttonholes of the series 82 accordingly gives, in the illustrated example, fifteen different adjusted positions as to the waist of the garment.

Desirably means is provided for securing together the front and rear leg portions, at each side of the garment. Such means may be either of the tie form as previously illustrated and described in connection with Figs. 1 to 5, or of the detachable fastener form as disclosed in connection with the form of Fig. 8. As shown in Figs. 9 and 10, such leg-securing means may comprise ties or tapes 86, 86 having their inner ends secured upon a lower portion of the waist section 70, at opposite sides of its vertical median line and substantially set in from its lateral edges. Where the garment is made up of a plurality of layers of fabric, such as the layers *a*, *b*, *c* of Fig. 9, the inner ends of the ties 86 desirably are secured as by stitching, as represented by the dotted lines at 87, 87 Fig. 9, upon the inner face of the inner fabric layer *c*, the free ends of the ties being led out through eyelets 88 appropriately located in each of the other layers, such as layers *b* and *a* of the illustrated example. The ties 86 thus additionally serve to retain the plurality of layers in proper relative position during use of the garment, but present no interference to the separation of the plurality of thicknesses of fabric, for laundering, drying, and airing the garment as previously explained.

In a generally similar manner, the front section 76 has anchored at the inner face of the innermost fabric layer *c* a pair of ties 90, 90 adapted to be led out through eyelets 91, 91 in the other layers *b* and *a*. The inner, anchored ends of the ties 90 preferably are doubled over, before stitching, to provide loops 92, 92 adapted to be brought out through the eyelets 91 through the other fabric layers *a* and *b*, so as to be available at the front of the garment for attaching stockings or other articles of apparel.

The garment in either of its main forms as herein disclosed may additionally be provided with fastening means of the character described, such as shown separately in Fig. 6, at the upper central edge portions of the front and rear sections, and also if desired at the upper side edges of the garment for the attachment of other apparel, such as shirts and vests as generally worn by older infants and young children. If preferred, the garment may be supplied merely with buttonholes at the locations here referred to.

My invention is not limited to the particular embodiments thereof as herein illustrated and described, its scope being pointed out in the following claims.

I claim:

1. A lower garment for infants, said garment comprising one or more similarly shaped fabric plies proportioned to form front and rear garment sections each comprising a waist portion and an intermediate connecting leg portion of reduced lateral extent, the rear section being so proportioned laterally that its side edge portions may be brought around at the front of the wearer to adjustable extents, the front section having at each side of its waist portion a plurality of laterally spaced vertically elongated eyelets, the rear section having at each side of its waist portion one or more buttonholes, and, for each side of said front section, a flat, inelastic one-piece fabric fastening strip for reception in a selected pair of the eyelets, said strip having a total extent not greatly exceeding twice the distance between adjacent eyelets, so as to form a flat band snugly surrounding the material between said eyelets, and having a button at one end portion and a buttonhole spaced from the button lengthwise the strip, said button and buttonhole being first interengageable to secure the strip removably in position in said eyelets of the front section, and said button being thereafter receivable in a buttonhole at the corresponding side of the rear section, to secure the garment in adjusted wearing position.

2. A lower garment for infants, said garment comprising one or more similarly shaped fabric plies proportioned to form front and rear garment sections each comprising a waist portion and an intermediate connecting leg portion, one section being so proportioned laterally that its side edge portions may be brought around at the opposite side of the wearer to adjustable extents, at least one waist portion having at its upper edge a plurality of laterally spaced vertically elongated eyelets, another waist portion having at a corresponding location one or more buttonholes, and, for each such plurality of eyelets, a flat, inelastic one-piece fabric fastening strip for reception in a selected pair of the eyelets, said strip having a total extent not greatly exceeding twice the distance between adjacent eyelets, so as to form a flat band snugly surrounding the material between said eyelets, and having a button at one end portion and a buttonhole spaced from the button lengthwise the strip, said button and buttonhole being first interengageable to secure the strip removably in position in said eyelets and said button being thereafter receivable in one of said waist-portion buttonholes to fasten said waist-portions in adjusted wearing position.

3. In a lower garment for infants, said garment having front and rear sections each including a waist portion and a connecting leg portion, means for releasably fastening together the waist portions of the two sections comprising flexible fastening strips each carrying a button and cooperating buttonhole formation, eyelets on one section for detachably receiving said fastening strips and buttonholes for the buttons thereof on the other section, a pair of cooperable ties at each side of the garment, one tie of each pair having its secured end stitched upon the leg portion of the front section substantially in from the lateral edge thereof, and the other tie of each pair being similarly located and secured upon the rear section, the inner portions of the ties for the front section being doubled upon themselves and secured to the garment in said doubled form, to provide attaching loops.

4. In a lower garment for infants, said garment having front and rear sections each including a waist portion and a connecting leg portion, means for releasably fastening together the waist portions of the two sections comprising flexible fastening strips each carrying a button and cooperating buttonhole formation, eyelets on one section for detachably receiving said fastening strips and buttonholes for the buttons thereof on the other section, said garment as a whole comprising a fabric body of a size and shape to provide two similar main parts laterally joined, each such part including said front and rear sections complete, said two main parts adapted to be folded flatwise upon each other for use, to receive sheet material inserted between them, and to be opened and spread for laundering and drying purposes, and ties each having one of their ends anchored at the inner face of the inner main part, and the other main part having apertures for the passage of said ties, whereby the latter additionally serve to retain said main parts in matching relation.

5. A lower garment for infants, said garment comprising one or more similarly shaped fabric plies proportioned to form front and rear garment sections each comprising a waist portion and an intermediate connecting leg portion of reduced lateral extent, the rear section being so proportioned laterally that its side edge portions may be brought around at the front of the wearer to adjustable extents, the front section having at each side of its waist portion a plurality of laterally spaced fastener-device attaching formations, the rear section having at each side of its waist portion one or more fastener elements, and, for each side of said front section, a flat, inelastic one-piece fabric fastening strip for reception by a plurality of said attaching formations and said strip having a total extent of at least twice the distance between adjacent attaching formations so as to form a flat band snugly surrounding the material between said attaching formations, and having a fastener device at one end portion and another fastener device spaced from the first lengthwise the strip, said fastener devices of the strip being first engageable to secure the strip in position at said attaching formations of the front section, and a fastener device of the strip being thereafter receivable by a fastener element at the corresponding side of the rear section, to secure the garment in adjusted wearing position.

6. A lower garment for infants, said garment comprising one or more similarly shaped fabric plies proportioned to form front and rear garment sections each comprising a waist portion and an intermediate connecting leg portion, one section being so proportioned laterally that its side edge portions may be brought around at the opposite side of the wearer to adjustable extents, at least one waist portion having at its upper edge a plurality of laterally spaced vertically elongated eyelets, another waist portion having at a corresponding location one or more fastener elements, and, for each such plurality of eyelets, a flat, inelastic one-piece fabric fastening strip for reception in a selected pair of the eyelets, said strip having a total extent not greatly exceeding twice the distance between adjacent eyelets, so as to form a flat band snugly surrounding the material between said eyelets, and having a fastener element at one end portion and one or more fastener elements spaced from said first fastener element lengthwise the strip, said fastener elements of the strip being first interengageable to secure the strip removably in position in said eyelets and one of them being thereafter receivable by one of said waist-portion fastener elements to fasten said waist-portions in adjusted wearing position.

7. In a lower garment for infants, said garment having front and rear sections each including a waist portion and a connecting leg portion, means for releasably fastening together the waist portions of the two sections comprising flexible fastening strips each carrying a plurality of fastener devices, attaching formations on one section for receiving said fastening strips and fastener elements for the fastener devices thereof on the other section, a pair of cooperable tapes at each side of the garment, one tape of each pair having its secured end stitched upon the leg portion of the front section substantially in from the lateral edge thereof, and the other tape of each pair being similarly located and secured upon the rear section, each pair of tapes, at the corresponding side of the front and rear sections of the garment, adapted to have the free portions adjustably secured together to fasten the garment leg portions in wearing position, the inner portions of the tapes for at least one of said sections being doubled upon themselves and secured to the garment in said doubled form.

8. In a lower garment for infants, said garment having front and rear sections each including a waist portion and a connecting leg portion, means for releasably fastening together the waist portions of the two sections comprising flexible fastening strips each carrying a plurality of fastener devices, attaching formations on one section for receiving said fastening strips and fastener elements for the fastener devices thereof on the other section, said garment as a whole comprising a fabric body of a size and shape to provide two similar main parts laterally joined, each such part including said front and rear sections complete, said two main parts adapted to be folded flatwise upon each other for use, to receive sheet material inserted between them, and to be opened and spread for laundering and drying purposes, and tapes each having one of their ends anchored at the inner face of the inner main part, and the other main part having apertures for the passage of said tapes, whereby the latter additionally serve to retain said main parts in matching relation.

JOHN R. LANKENAU.